July 1, 1941.  E. W. WILSON  2,247,426
TOOL FOR INSERTING OR REMOVING CORPORATION STOPS
Filed Sept. 13, 1937
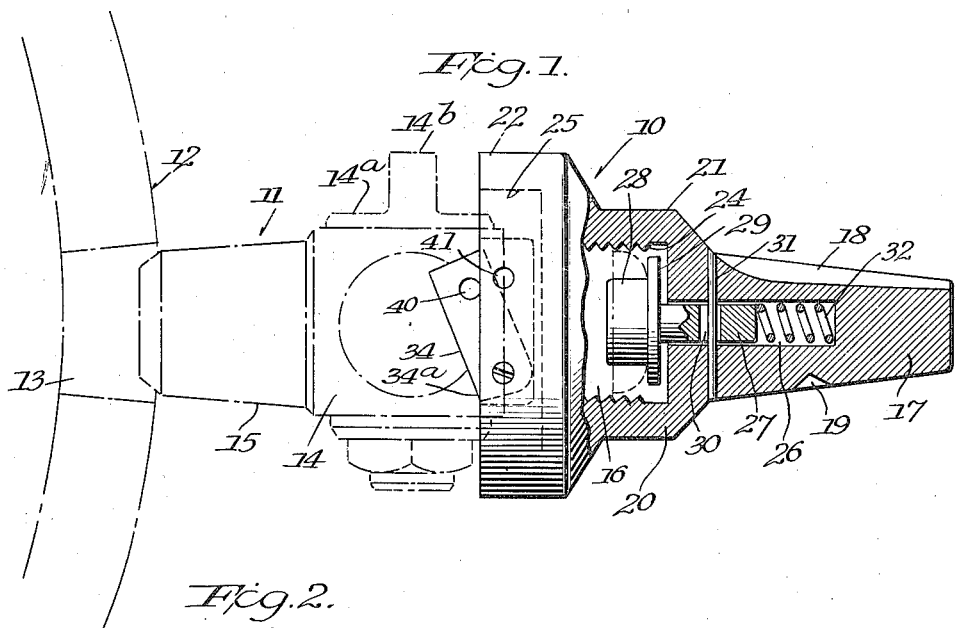
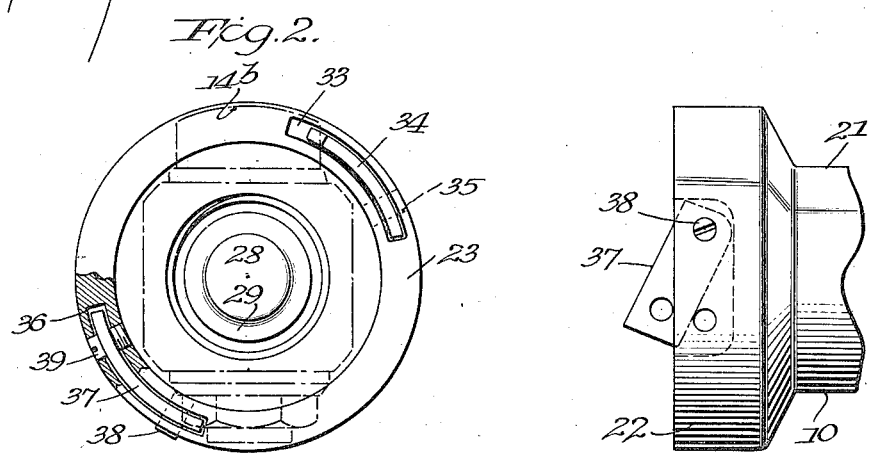
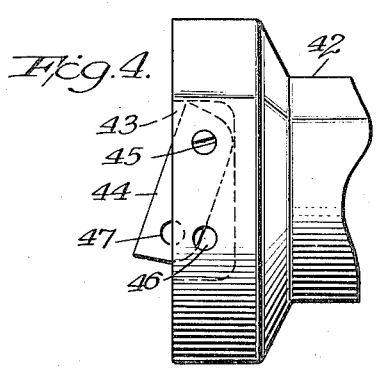
Inventor
Edwin W. Wilson
By Cushman Darby & Cushman
Attorneys Patented July 1, 1941

2,247,426

UNITED STATES PATENT OFFICE 2,247,426

TOOL FOR INSERTING OR REMOVING CORPORATION STOPS

Edwin W. Wilson, Tampa, Fla., assignor to Mueller Co., Decatur, Ill., a corporation of Illinois Application September 13, 1937, Serial No. 163,674

9 Claims. (Cl. 81—53)

This invention relates to a tool for use in turning corporation stops for the purpose of inserting them in or removing them from gas or water mains or the like.

The ordinary tool used, for example, in applying corporation stops comprises a head provided with a threaded socket adapted to be screwed on the outlet nipple of the stop. Considerable turning force must be applied to the tool and the latter and the stop are apt to become jammed together so that the stop will tend to follow the tool when it is attempted to remove the tool. Furthermore, the nipple is apt to be damaged in the operation.

In accordance with the present invention, coacting means are provided whereby rotative movement of the tool is positively imparted to the stop without the nipple's being fully engaged in the socket so as to jam therein. Consequently, the removal movement of the tool from an inserted stop is entirely free. The same tool may be used for removing a previously inserted stop.

While the invention is susceptible of varied embodiment, I have shown practical forms by way of example in the accompanying drawing.

In the drawing:

Figure 1 shows one form of the new tool partly in elevation and partly in axial section, a typical corporation stop and a portion of a main being shown in dot and dash lines;

Figure 2 is a bottom view of the tool, partly broken away;

Figure 3 is a partial elevation of the side of the tool opposite that shown in Figure 1; and Figure 4 is a view similar to that of Figure 3, but showing a slightly modified form of tool.

Referring to the drawing and first to Figures 1, 2 and 3, reference numeral 10 designates generally the new tool, reference numeral 11 a corporation stop with which the tool is engaged, and reference numeral 12 a main having a threaded aperture 13 in which the stop is to be inserted. The stop comprises a body portion 14 which includes the usual valve plug 14a, and projecting from opposite ends of the body are the threaded nipples 15 and 16 of which the former is to be inserted in the opening 13 while the latter is temporarily engaged with the tool 10. The stop may be of any standard design, for example, as is shown in Patent 1,599,098 to Mix, September 7, 1926, or 1,777,628 to Reedy, October 7, 1930.

The tool 10 comprises a tapered shank portion 17 having a longitudinal groove 18 and an opposite indent 19. The shank is engageable in the socket of the usual boring bar, the groove 18 being engaged by a key and the indent 19 by a set screw. At its large end the shank 17 merges outwardly into a head 20 whose expanded cylindrical portion 21 terminates in a further enlarged cylindrical flange or rim 22 having the end face 23.

Head 20 is provided with a threaded socket 24 coaxial with stem 17, the end cavity 25 defined by the rim or flange 22 being sufficiently large to clear the stop body 14 when the stop nipple 16 is engaged in the socket 24 as shown in Figure 1.

Shank 17 is provided with an axial bore 26 in which is slidable the stem portion 27 of a pressure member which comprises a head having a cylindrical boss portion 28 adapted to enter and center the end of the nipple 16 and a base flange 29 adapted to abut the end of the nipple. Stem 27 is provided with a longitudinally extending slot 30 through which passes a pin 31 whose ends are engaged in diametrically disposed bores in the shank 17. A compression spring 32 disposed in bore 26 acts to urge the pressure member outwardly, such movement being limited by the pin 31.

In an arcuate recess 33 formed in the outer face 23 of rim 22 is disposed an arcuate finger 34 pivoted in the recess adjacent one end on a substantially radially disposed pivot screw 35. The finger may lie wholly within the recess or it may swing outwardly to the position shown in Figure 1, movement beyond this position being prevented through abutment of the corner 34a of the finger with the adjacent end wall of the recess 33.

In an arcuate recess 36 opposite recess 33 is pivotally mounted an arcuate finger 37 on a radial pivot screw 38, the arrangement being the same as that of finger 34 except that assuming the tool, Figure 2, to be rotated in a counter-clockwise direction, the pivot of finger 34 is adjacent its trailing end, whereas the pivot of finger 37 is adjacent its leading end.

The finger 34 is designed to be operative in the inserting operation, and the finger 37 in the removal operation, and when one is used the other should be rendered inoperative. Provisions for this purpose are present when the fingers are removable upon removal of their pivot screws. On the other hand, means may be provided for retaining the idle finger in its recess. As here shown, the finger 37 is retained in its recess by a removable screw 39 passed through registering apertures in the rim and finger. Such apertures are shown at 40 and 41, Figure 1.

If the stop 11 is to be inserted in the opening 13 the finger 37 is rendered inoperative or ineffective either by removing it from the tool or by securing it in inoperative position by the screw 39. The finger 34 is manually held in its recess and nipple 16 threaded into socket 34 until it abuts the pressure member and moves the latter to substantially the relation shown. Hereupon, the finger 34 may be moved to the position shown in Figure 1 and the tool further turned relative to the stop in the threading direction. The finger is so disposed as to strike a portion of the stop body, which body is here contemplated as including the plug also. As indicated in Figure 2, the free end of finger 34 has come into abutment with the manipulating rib 14b of the stop plug 14a. The depth of the socket is such that engagement of the finger 34 with the body has occurred prior to the reception of the nipple in the socket to such an extent as to cause jamming.

The stop is now forced to participate in the rotative movement of the tool and may be threaded to position in opening 13 whereupon the tool may be removed by reverse rotation, the finger 34 riding freely, as a pawl, over any body portions which it may encounter.

The socket threads engage the nipple threads with a loose fit and the pressure member is provided to center and steady the stop as it is being moved to position. It will be understood that the stops are ordinarily inserted in the top of the main, and the pressure member serves to prevent the stop from dropping away with the tool. Under the condition just mentioned, the finger will drop by gravity from its recess when released.

If it is desired to remove a stop, the finger 34 is rendered inoperative and the finger 37 operative. The tool may be screwed on the nipple 16 as far as it will go, the finger 37 riding freely over any body portions in its path, as a pawl. However, when the tool is reversely turned the free end of the finger positively engages a body portion, and enforced rotation of the stop in the unscrewing direction follows. The operative position of finger 37 is shown in Figure 3.

It will be understood that if the abutment finger 34, for example, were to be fixed in the position shown, it would ordinarily get only an insecure hold on the stop body when the tool was screwed on the latter. Consequently, it is preferable that the finger be pivoted as described.

According to Figure 4, the tool 42, generally similar to the tool 10, differs from the latter in being provided with a single arcuate recess 43 in which is disposed an arcuate finger 44 adapted to pivot about a screw 45 which may be placed as shown or in the bore 46 so as to pivotally engage the finger through the opening 47 in the latter. The finger has its inner corners rounded as shown in order to be able to swing a certain distance about the pivot pin in whichever end it is disposed. In Figure 4 the finger is disposed for a removal operation. It will be evident that for the inserting operation it is only necessary to transpose the pivot screw.

It will be seen that the new tool is of very simple construction, and while here shown as integrally formed, need not necessarily be so. The action of the tool is positive, and no jamming of the nipple in the socket can ordinarily occur. When the end of the nipple strikes the pressure member upon connecting the tool with the stop, the increased resistance is an indication to the operator that the finger 34 should be projected to operative position. Upon removal, the tool may be screwed on the nipple as far as it will go, since the engagement will loosen before the finger strikes a body part upon reverse rotation of the tool. In any event there is no jamming tendency during removal.

The described embodiments of the invention are merely illustrative, and do not limit myself to the form and arrangement of parts except as in the following claims.

I claim:

1. A tool for use in turning corporation stops, said stops including a body and threaded nipples projecting from opposite ends of said body, said body including a side portion adjacent one of said nipples faced oppositely to the threading direction of the latter, said tool comprising a shank portion and a head portion at one end of the shank portion having a threaded socket therein coaxial with said shank portion and engageable with said one of said nipples, and a retractible abutment projectable in the axial direction of the tool beyond the head portion in the opposite direction from said shank portion; said abutment being maintainable in retracted relation so that its leading edge will clear said side portion as the socket is threaded on said one of said nipples and being then projectable so that its leading edge will firmly engage said side portion as threading of the socket on said one of said nipples continues and prior to such full reception of said one of said nipples in said socket as would cause jamming, whereby to positively transmit rotation of the tool to the stop in the inserting direction of the latter; said abutment due to its retractabiliy riding over any body portion encountered by it upon reverse rotation of the tool relative to the stop so that the tool is readily removable from the stop.

2. A tool for use in turning corporation stops, said stops including a body and threaded nipples projecting from opposite ends of said body, said body including a side portion adjacent one of said nipples faced oppositely to the threading direction of the latter, said tool comprising a shank portion and a head portion at one end of the shank portion having a threaded socket therein coaxial with said shank portion and engageable with said one of said nipples, and a retractable abutment in the form of a finger pivoted at one end on an axis which extends transversely of the tool projectable in the axial direction of the tool beyond the head portion in the opposite direction from said shank portion; said abutment being maintainable in retracted relation so that its leading edge will clear said side portion as the socket is threaded on said one of said nipples and being then projectable so that its leading edge will firmly engage said side portion as threading of the socket on said one of said nipples continues and prior to such full reception of said one of said nipples in said socket as would cause jamming, whereby to positively transmit rotation of the tool to the stop in the inserting direction of the latter; said abutment due to its retractability riding over any body portion encountered by it upon reverse rotation of the tool relative to the stop so that the tool is readily removable from the stop.

3. A tool according to claim 1 provided with a second abutment effective to engage a side portion of the body upon reverse rotation of the tool whereby to impart reverse rotation to the stop, and wherein provisions are present for rendering one or the other of said abutments inoperative.

4. A tool according to claim 2 wherein provisions are present for alternatively pivoting the finger at its other end to render it effective to abut another side portion of the stop body upon rotation of the tool in the unthreading direction.

5. A tool according to claim 2 wherein a second finger is provided and is pivoted on an axis so disposed that said second finger will be effective to abut a side portion of the stop body upon rotation of the tool in the unthreading direction, and wherein provisions are present enabling one or the other of said fingers to be rendered ineffective.

6. A tool according to claim 1 wherein yieldable means are provided at the inner end of said socket for yieldingly engaging said one of said nipples while the latter is operatively engaged in said socket.

7. A tool for use in removing corporation stops, said stops including a body and threaded nipples projecting from opposite ends of said body, said body including a side portion adjacent one of said nipples faced oppositely to the unthreading direction of the latter, said tool comprising a shank portion and a head portion at one end of the shank portion having a threaded socket therein coaxial with said shank portion, and engageable with said one of said nipples, and a retractable abutment projectable in the axial direction of the tool beyond said head portion in the opposite direction from said shank portion, said abutment due to its retractability riding over any body portion encountered by it when said socket is threaded to a substantial extent on said one of said nipples; said abutment having a leading edge, which in the projected relation of the abutment and upon reverse rotation of the tool relative to the stop, engages said side portion whereby rotation of the tool is positively transmitted to the stop, said abutment being maintainable in retracted relation to enable the tool to be unthreaded from the removed stop.

8. A tool according to claim 7 wherein the abutment is constituted by a pivoted finger arranged to coact substantially as a pawl with the stop body.

9. A tool for use in turning corporation stops, said stops including a body and threaded nipples projecting from opposite ends of said body, said body including a side portion adjacent one of said nipples faced oppositely to the threading direction of the latter, said tool comprising a shank portion and a head portion at one end of the shank portion having a threaded socket therein coaxial with said shank portion and engageable with said one of said nipples, said head portion including an annular rim radially outwardly of the socket and provided with a recess faced in the opposite direction from said shank portion, and a retractable and projectable abutment in said recess; said abutment being maintainable in retracted relation so that its leading edge will clear said side portion as the socket is threaded on said one of said nipples and being then projectable so that its leading edge will firmly engage said side portion as threading of the socket on said one of said nipples continues and prior to such full reception of said one of said nipples in said socket as would cause jamming, whereby to positively transmit rotation of the tool to the stop in the inserting direction of the latter; said abutment being movable inwardly of said recess as its outer end engages a side portion of a body upon reverse rotation of the tool relative to the stop after insertion of the latter has been completed.

EDWIN W. WILSON.